United States Patent
Gelberg

(10) Patent No.: US 10,571,636 B2
(45) Date of Patent: Feb. 25, 2020

(54) SUBSTRATE-GUIDE BASED OPTICAL SYSTEMS WITH FIELD CURVATURE EFFECT MITIGATION

(71) Applicant: LUMUS LTD, Ness Ziona (IL)

(72) Inventor: Jonathan Gelberg, Modiin (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 16/423,014

(22) Filed: May 26, 2019

(65) Prior Publication Data

US 2019/0361240 A1 Nov. 28, 2019

Related U.S. Application Data

(60) Provisional application No. 62/677,001, filed on May 27, 2018.

(51) Int. Cl.
| | |
|---|---|
| *G02B 6/42* | (2006.01) |
| *G02B 27/01* | (2006.01) |
| *F21V 8/00* | (2006.01) |

(52) U.S. Cl.
CPC ........... *G02B 6/4204* (2013.01); *G02B 6/003* (2013.01); *G02B 6/0016* (2013.01); *G02B 6/4298* (2013.01); *G02B 27/0172* (2013.01); *G02B 27/0176* (2013.01); *G02B 6/0011* (2013.01); *G02B 6/4213* (2013.01); *G02B 2027/011* (2013.01); *G02B 2027/015* (2013.01)

(58) Field of Classification Search
CPC ........... G02B 27/0172; G02B 27/1033; G02B 27/1066; G02B 27/141; G02B 27/144; G02B 27/145; G02B 27/149; G02B 27/283; G02B 6/0001; G02B 6/0011; G02B 6/0033; G02B 6/4204; G02B 6/4213; G02B 6/4298; G02B 6/0016; G02B 6/0035; G02B 5/04; G02B 13/22; G02B 17/08; G02B 17/0892; G02B 26/101; G02B 26/105; G02B 26/0833; G02B 2027/0125; G02B 2027/0114; G02B 2027/0178; G09G 3/025; G09G 3/346; G09G 3/3406; G09G 3/2096; H04N 13/344
USPC ................. 385/15, 31, 33, 39, 129–132, 901
See application file for complete search history.

(56) References Cited

U.S. PATENT DOCUMENTS

| | | | |
|---|---|---|---|
| 9,316,832 B2 * | 4/2016 | Levin | H04N 13/344 |
| 9,429,756 B1 * | 8/2016 | Cakmakci | G02B 27/0172 |
| 2006/0228073 A1 * | 10/2006 | Mukawa | G02B 6/0033 385/31 |

* cited by examiner

*Primary Examiner* — Michael P Mooney
(74) *Attorney, Agent, or Firm* — Mark M. Friedman

(57) ABSTRACT

A light-transmitting substrate has at least a first and a second major external surface. An electronic display source emanates light waves. A coupling-in optical arrangement couples light waves from the electronic display source into the light-transmitting substrate to effect total internal reflection of the coupled-in light waves between the major external surfaces of the light-transmitting substrate. An optical element is deployed in an optical path for light waves to traverse from the electronic display source into the light-transmitting substrate. The optical element defines a field curvature that causes light rays of the traversing light waves to diverge or converge. A lens is deployed in the optical path and reduces the field curvature. The electronic display source has a curvature that is matched to the reduced field curvature to counteract the divergence or convergence of the light rays caused by the reduced field curvature.

22 Claims, 5 Drawing Sheets

SUBSTRATE-GUIDE BASED OPTICAL SYSTEMS WITH FIELD CURVATURE EFFECT MITIGATION

CROSS-REFERENCE TO RELATED APPLICATIONS

This application claims priority from U.S. Provisional Patent Application No. 62/677,001, filed May 27, 2018, whose disclosure is incorporated by reference in its entirety herein.

TECHNICAL FIELD

The present invention relates to substrate-guided optical devices which include a plurality of reflecting surfaces carried by a common light-transmissive substrate.

BACKGROUND OF THE INVENTION

One important application for compact optical elements is in head-mounted displays (HMDs), wherein an optical module serves both as an optical collimating system and a combiner, wherein a two-dimensional image source is imaged to infinity and reflected into the eye of an observer. The display source can be obtained directly from either a spatial light modulator (SLM) such as a cathode ray tube (CRT), a liquid crystal display (LCD), an organic light emitting diode array (OLED), a micro-LED display, a scanning source or similar devices, or indirectly, by means of a relay lens or an optical fiber bundle. The display source comprises an array of elements (pixels) imaged to infinity by a collimating lens and is transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, however, such a conventional optical module becomes larger, heavier and bulkier, and therefore, even for a moderate performance device, such as a system, is impractical. This is a major drawback for all kinds of displays and especially in head-mounted applications, wherein the system should necessarily be as light and as compact as possible. In addition, the flatness of the display source, used in conjunction with a collimating system having some field curvature aberration, may contribute to degradations in the image viewed by the observer.

The strive for compactness has led to several different complex optical solutions, all of which on the one hand, are still not sufficiently compact for most practical applications, and on the other hand, suffer major drawbacks in terms of manufacturability. Furthermore, the eye-motion-box (EMB) of the optical viewing angles resulting from these designs is usually very small, typically less than 8 mm Hence, the performance of the optical system is very sensitive, even for small movements of the optical system relative to the eye of the viewer, and does not allow sufficient pupil motion for comfortable reading of text from such displays.

SUMMARY OF THE INVENTION

The present invention is directed to optical systems having a substrate-guide optical element and various field curvature mitigation components, which in certain embodiments includes a field lens arrangement which mitigates the effects of field curvature, which is the result of using a flat electronic display source in combination with collimating optics. Other embodiments include a curved electronic display source having curvature that is matched (or at least partially matched) to the field curvature of the optical system, thereby counteracting (or at least partially counteracting) the effects of field curvature caused divergence or convergence of light rays that traverse through the optical system. In all embodiments, the electronic display source emanates light waves that are coupled into the substrate-guide optical element, and subsequently coupled out of the substrate-guide optical element into the eye of an observer (i.e., viewer) as an image. The substrate-guide optical element facilitates the expansion of the coupled-out image so that the size of the optical aperture at the plane of the eye of the observer is larger than that at the input to the element. Such expansion may be alternatively referred to as aperture multiplication.

According to the teachings of an embodiment of the present invention, there is provided an optical system. The optical system comprises: a light-transmitting substrate having a plurality of surfaces including at least a first and a second major external surface; an electronic display source from which light waves emanate; a coupling-in optical arrangement for coupling light waves emanating from the electronic display source into the light-transmitting substrate to effect total internal reflection of the coupled-in light waves between the major external surfaces of the light-transmitting substrate; at least one optical element deployed in an optical path for light waves to traverse from the electronic display source into the light-transmitting substrate, the at least one optical element defining a field curvature of the optical system that causes light rays of the traversing light waves to diverge or converge; and at least one lens, deployed in the optical path downstream from the electronic display source and upstream from the coupling-in optical arrangement, that creates a partially compensating field curvature and partially compensates the field curvature of the optical system so as to reduce the field curvature of the optical system, and the electronic display source is a curved display source having a curvature that is matched to the reduced field curvature of the optical system so as to counteract divergence or convergence of the traversing light rays caused by the reduced field curvature.

Optionally, the at least one lens is a positive powered lens.

Optionally, the at least one lens is a negative powered lens.

Optionally, the at least one lens includes a concave surface.

Optionally, the optical system further comprises: an illumination prism assembly for directing light from an illuminator to the electronic display source to stimulate the electronic display source to emanate light waves, and for directing the light waves emanating from the electronic display source toward the coupling-in optical arrangement.

Optionally, at least a portion of the at least one lens is optically attached to at least a portion of the illumination prism assembly.

Optionally, the illumination prism assembly includes at least one prism and a polarization sensitive beamsplitter, and at least a portion of the at least one lens is optically attached to at least a portion of a surface of the at least one prism.

Optionally, the optical system further comprises: an optical module for receiving the light waves emanating from the electronic display source via the illumination prism assembly, and for collimating the received light waves and directing the collimated light waves to the coupling-out optical arrangement.

Optionally, at least a portion of the at least one lens is optically attached to at least a portion of the optical module.

Optionally, the optical module includes a pair of prisms and a polarization sensitive beamsplitter, and at least a portion of the at least one lens is optically attached to at least a portion of a surface of at least one of the prisms.

Optionally, the at least one lens is deployed in the optical path downstream from the illumination prism assembly and upstream from the optical module.

Optionally, the at least one optical module includes the at least one optical element.

Optionally, the optical system further comprises: an optical module for collimating the light waves emanating from the electronic display source and directing the collimated light waves to the coupling-in optical arrangement.

Optionally, at least a portion of the at least one lens is optically attached to at least a portion of the optical module.

Optionally, the optical module includes a pair of prisms and a polarization sensitive beamsplitter, and at least a portion of the at least one lens is optically attached to at least a portion of a surface of at least one of the prisms.

Optionally, the optical module further includes at least one collimating lens.

Optionally, the optical module includes the at least one optical element that defines the field curvature of the optical system.

Optionally, the electronic display source is a micro-display.

Optionally, the electronic display source is an organic light emitting diode display.

There is also provided according to an embodiment of the teachings of the present invention an optical system. The optical system comprises: a light-transmitting substrate having a plurality of surfaces including at least a first and a second major external surface; an electronic display source from which light waves emanate; a coupling-in optical arrangement for coupling light waves emanating from the electronic display source into the light-transmitting substrate to effect total internal reflection of the coupled-in light waves between the major external surfaces of the light-transmitting substrate; and at least one optical element deployed in an optical path for light waves to traverse from the electronic display source into the light-transmitting substrate, the at least one optical element defining a field curvature of the optical system that causes light rays of the traversing light waves to diverge or converge, and the electronic display source is a curved display source having a curvature that is matched to the field curvature of the optical system so as to counteract the divergence or convergence of the light rays caused by the field curvature.

Optionally, the electronic display source is a micro-display.

Optionally, the electronic display source is an organic light emitting diode display.

The optical systems of the present disclosure rely on a combination of various optical components, including collimating optics, various prism assemblies (e.g., illumination and imaging assemblies), and the above-mentioned substrate-guide optical element and field lens arrangement. The combination of the such components are not straightforward combinations, as the specific design parameters of the individual components are interdependent, and the design specifications of one component or subcomponent are determined according to the design specifications and unique properties of one or more other components or subcomponents of the optical system. As such, a synergy arises by the combination of the components and subcomponents of the optical systems of the present disclosure, which lends to enhanced quality of the image viewed by the observer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
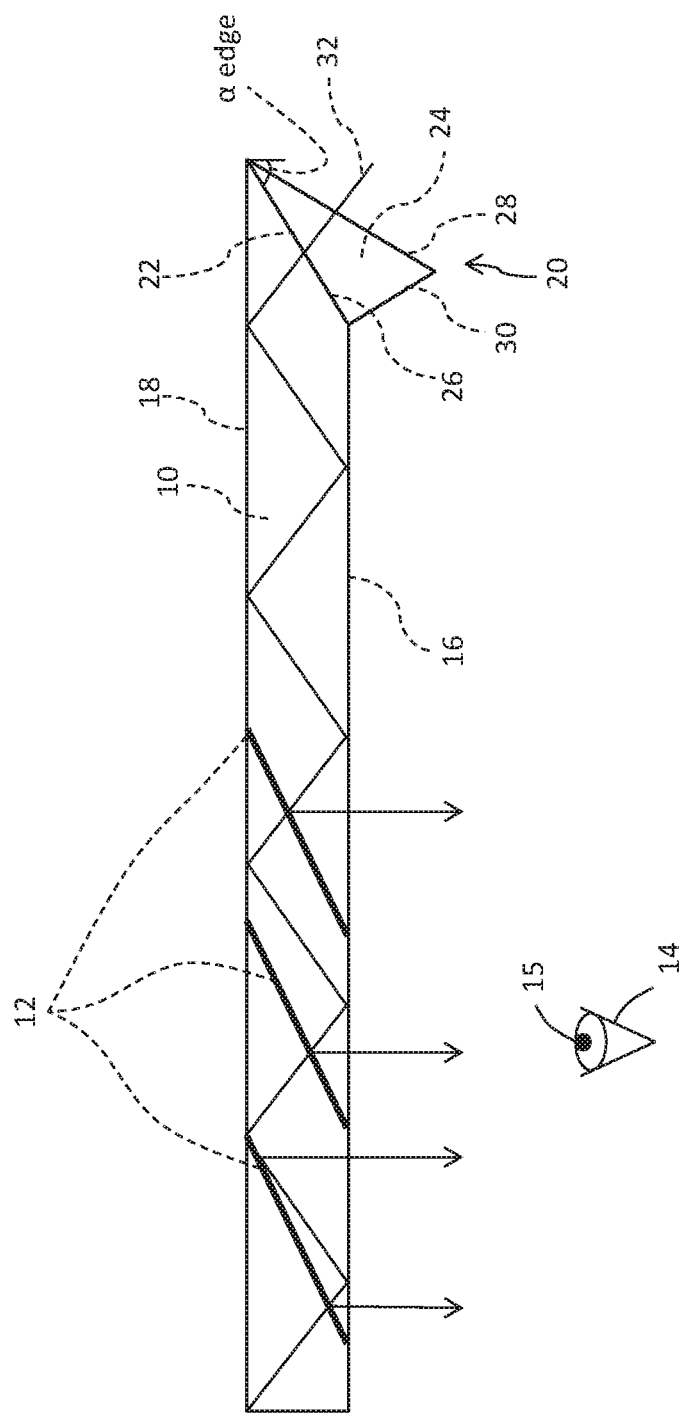
FIG. 1 is a side view of an exemplary light-guide optical element (LOE), according to an embodiment of the present invention.

The present invention is directed to optical systems having a substrate-guide optical element and field curvature effect mitigation components that arise from the use of collimating optics in combination with a flat electronic display. In certain embodiments, the field curvature mitigation is effectuated by a field lens that compensates for the field curvature of the optical system. In such embodiments, the electronic display source emanates light waves that are coupled into the substrate-guide optical element by coupling-in optical arrangement, and the coupled-in light waves are subsequently coupled out of the substrate-guide optical element by one or more partially reflecting surfaces into the eye of an observer (i.e., viewer) as an image. The field lens is generally deployed in the optical path of the optical system downstream of the electronic display source and upstream from the coupling-in optical arrangement. In certain non-limiting implementations, the field lens is deployed in the optical path downstream from an illumination prism assembly and upstream from a collimating optical module.

In other embodiments, the field curvature mitigation is effectuated by implementing the electronic display source as a curved display source having curvature that is matched (or at least partially matched) to the field curvature of the optical system, thereby counteracting (or at least partially counteracting) the effect of the field curvature caused divergence or convergence of light rays that traverse through the optical system.

The principles and operation of the optical system according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, upper and lower, top and bottom, and the like. These directional references are exemplary only to illustrate the invention and embodiments thereof.

Referring now to the drawings, FIG. 1 illustrates a sectional view of components of an optical system according to embodiments of the present disclosure. The optical system includes a planar light-transmitting substrate 10 and associated components (hereinafter also referred to as a lightguide optical element or "LOE"). The LOE functions as an optical waveguide that guides light waves from an input optical surface to an output optical surface. The planar substrate 10 includes a major lower surface 16 and a major upper surface 18 that are parallel to each other. A coupling-in optical arrangement 20 is illuminated by light waves (represented by optical ray 32), which are collimated from an electronic display source (not shown in FIG. 1). According to certain embodiments, the coupling-in optical arrangement 20 includes a slanted edge 22 of the substrate 10 and a prism 24. The edge 22 is oriented at an oblique angle with respect to the major lower and upper surfaces 16, 18 of the substrate 10, wherein $\alpha_{edge}$ is the angle between the edge 22 and the normal to the major lower and upper surfaces 16, 18 of the substrate 10. The prism 24 includes three major surfaces 26, 28, 30, with the surface 26 being located next to the edge 22 of the substrate 10, and surfaces 28 and 30 being polished surfaces. In certain embodiments, the refractive index of the prism 24 is similar to the refractive index of the substrate 10, while in other embodiments the prism 24 and the substrate 10 have different refractive indices. The optical ray 32 enters the prism 24 through the surface 28. The surface 28 is preferably oriented normally to the central light wave of the incoming ray (i.e., the optical ray 32). The optical ray 32 then passes through the surface 26 to enter the substrate 10 through the edge 22, whereby the optical ray 32 is trapped inside the planar substrate 10 of the LOE by total internal reflection. After several reflections of the major lower and upper surfaces 16, 18 of the substrate 10, the trapped waves reach a coupling-out optical arrangement 12, which couple the light waves out of the substrate 10 into a pupil 15 of an eye 14 of a viewer, which form an image viewed by the viewer. In certain preferred embodiments, the coupling-out optical arrangement is implemented as an array of selective partially reflecting surfaces.

Herein, the input surface of the LOE will be regarded as the surface through which the input light waves enter the LOE, and the output surface of the LOE will be regarded as the surface through which the trapped waves exit the LOE. In the case of the LOE illustrated in FIG. 1, the input surface is on the slanted edge 22 and the output surface is on the lower surface 16. Other configurations, however, are envisioned in which the input and image waves could be located on the same side of the substrate 10. In such a configuration, the coupling-in optical arrangement 20 may be realized by a reflecting surface that is oriented at an oblique angle with respect to the major lower and upper surfaces 16, 18 of the substrate 10, such that the input surface of the LOE is on the major lower surface 16 and the coupling-in reflecting surface reflects the incident light waves such that the light is trapped inside the substrate 10 by total internal reflection. Still yet other configurations are envisioned in which the input surface is on the upper surface 18 and the output surface is on the lower surface 16.

In order to provide a focused image to the viewer with reduced aberrations, the light waves which illuminate the coupling-in optical arrangement 20 should be planar light waves, and the optical rays from different fields of the light waves emanating from the electronic display source should be as near to parallel to each other as possible. The use of collimating optics helps to at least partly ensure that the optical rays from different fields entering the LOE are substantially parallel to each other. However, the light waves emanating from the electronic display source may be subjected to the effects of field curvature, which may arise when the object to be imaged is a generally flat object normal to the optical axis of the optical system, and is imaged through collimating optics having some field curvature aberration, as in the case when the electronic display source is implemented as a flat display source (e.g., a liquid crystal on silicon (LCOS) microdisplay). The effects of field curvature are especially felt for the light waves corresponding to off-center pixels of the electronic display source. Field curvature causes some of the light waves traversing the optical system that are coupled into the LOE by the coupling-in optical arrangement 20 to be non-planar light waves with divergent or convergent rays (i.e., non-parallel rays). The effects of non-planar light waves caused by field curvature are manifested in the image viewed by the viewer as defocused images away from the center of the field of view of the input aperture to the LOE, as well as discrete jumps in the image.

To mitigate the effects of field curvature, a field lens is deployed in the optical path between the electronic display source and the LOE. The following paragraphs describe the deployment of such a field lens, specifically with respect to the location of the field lens in the optical path relative to the electronic display source and the other components of the optical system. Ideally, the field lens should be positioned as close to the electronic display source as possible (i.e., as close to the object plane as possible) so as to advantageously affect a wider range of fields of the light waves emanating from the electronic display source. As will become apparent, the optical design of the illumination assembly and collimating optics of the optical system may limit the proximity of the field lens to the electronic display source.

Figure 2:
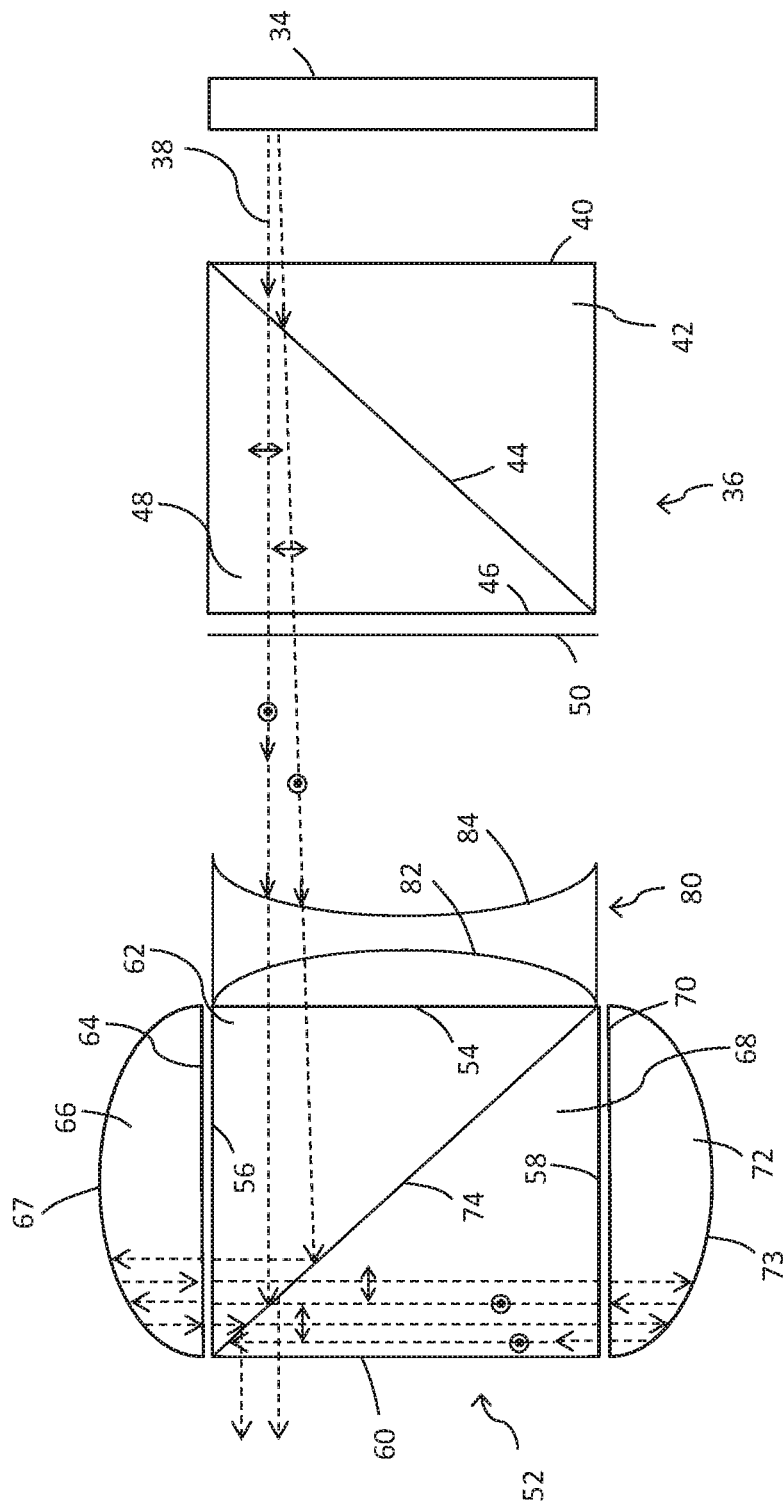
FIG. 2 is a schematic diagram of an illumination prism assembly and a collimating optical module having a field lens attached thereto, according to an embodiment of the present invention.

With continued reference to FIG. 1, refer now to FIG. 2, an electronic display source 34, an illumination prism assembly 36, and a collimating optical module 52 of the optical system. The collimating optical module 52 is deployed in the optical path of the optical system, between the electronic display source 34 and the LOE, allowing light waves (and representative light rays) to traverse the optical system from the electronic display source 34 into the LOE, as will be discussed in more detail below. The collimating optical module 52 includes one or more optical components, e.g., lenses 66, 72 and prisms 62, 68, which are the drivers of field curvature effects of the optical system when used in combination with a flat electronic display source. As such, one or more of the optical components of the collimating optical module 52 constitute optical elements that define the field curvature of the optical system, which results in a non-parallel beam of light rays at the input to the LOE. The electronic display source 34 is preferably implemented as a microdisplay, which may take the form of one of various displays known in the art of microdisplay technology. In a specific non-limiting implementation, the electronic display source 34 is implemented as an LCOS microdisplay. To better describe the deployment of the field lens relative to the optical components of the optical system, the embodiments of the present disclosure are subsequently described within the non-limiting context of the electronic display source 34 implemented as an LCOS microdisplay. Note, however, that the electronic display source 34 may be implemented in other ways, including, for example, as an organic light emitting diode array (OLED), or other suitable microdisplay.

With continued reference to FIG. 2, the illumination prism assembly 36 receives s-polarized input light waves from an illumination source (not shown), which are reflected off a polarizing beamsplitter 44 toward the electronic display source 34 to illuminate the image area of the electronic display source 34. In response to the received illumination of the s-polarized light waves at the image area of the electronic display source 34, the electronic display source 34 is stimulated (i.e., activated) to generate corresponding pixel output in the form of p-polarized light waves 38 emanating from the active pixels of the electronic display source 34. The light rays from the light waves emanating from a particular active pixel correspond to a particular field. The p-polarized light waves 38 are coupled into the illumination prism assembly 36 through a light-transmissive surface 40 of a prism 42 of the illumination prism assembly 36. The p-polarized light waves 38 pass through the polarizing beamsplitter 44 that transmits p-polarized light and reflects s-polarized light. The polarizing beamsplitter 44 is positioned between a slant edge surface of the prism 42 and a slant edge surface of a second prism 48 of the illumination prism assembly 36. The light waves are coupled out of the illumination prism assembly 36 through a light-transmissive surface 46 of the second prism 48, and then pass through a half-wavelength retardation plate 50, which converts the light waves to s-polarized light. The now s-polarized light waves 38 pass through a field lens 80, that is positioned in the optical path between the illumination prism assembly 36 and the collimating optical module 52, before entering the collimating optical module 52.

The field lens 80 creates a compensating field curvature in order to compensate for the field curvature of the optical system. The optical properties of the field lens 80, including the refractive index of the material from which the field lens 80 is constructed as well as the optical power of the surface of the lens, enable the creation of the compensating field curvature. The compensating field curvature of the field lens 80 counteracts the divergence or convergence of the light rays caused by field curvature effects and effectively flattens the field curvature of the optical system, enabling a flat object plane at the location of the electronic display source 34. The field lens 80 is more optically active at the edges of the field of view than at the center of the field of view (i.e., more active for fields corresponding to off-center pixels of the electronic display source 34). As such, the field lens 80 applies more corrective power to the light rays coming from pixels at the edges of the electronic display source 34 than for the light rays coming from pixels near the center of the electronic display source 34. The field lens 80 may be implemented as either a positive powered or negative powered lens, depending on the direction of the convergence or divergence of the input light rays from the electronic display source 34 to the LOE.

The flattening of the field curvature is effectuated by the refraction of the light rays in the same field by the field lens 80 due to the optical properties of the field lens 80 (e.g., the refractive index of the field lens 80 and the power of the surface of the field lens 80). The light rays from the same field that enter the field lens 80 are refracted by the optical surfaces of the field lens 80, such that the light rays from the same (i.e., common) field are parallel to each other at the input to the coupling-in optical arrangement 20 (i.e., prior to being coupled into the substrate 10). Although the field lens 80 is depicted as a single lens in FIG. 2, the field curvature flattening effect of the field lens may be realized by implementing the field lens 80 as more than one lens, for example as a doublet lens. In the non-limiting depiction of the field lens 80 in FIG. 2, the field lens 80 is implemented as a concave lens that includes concave surfaces 82 and 84.

The field lens 80 may be deployed at various positions in the optical path between the illumination prism assembly 36 and the collimating optical module 52, and in various implementations may be optically attached to portions of the illumination prism assembly 36 or the collimating optical module 52. For example, in the non-limiting implementation illustrated in FIG. 2, portions of the surface 82 are optically attached, for example via optical cement, to a light-transmissive surface 54 of a prism 62 of the collimating optical module 52. The surface 54 acts as the input surface of the collimating optical module 52. In another non-limiting implementation, portions of the surface 84 of the field lens 80 may be optically attached, for example via optical cement, to the retardation plate 50 or to the surface 46 of the second prism 48 between the illumination prism assembly 36 and the retardation plate 50. In yet a further non-limiting implementation, the field lens 80 may be mechanically positioned in the optical path between the illumination prism assembly 36 and the collimating optical module 52 such that neither of the surfaces 82 and 84 are optically attached to the illumination prism assembly 36, retardation plate 50, or collimating optical module 52. The mechanical positioning may be effectuated via a mechanical arm attached to an edge surface of the field lens 80 that may also be attached to a mechanical body which carries the major components of the optical system.

Note that the field lens 80 can also be implemented as a plano-concave lens, in which the surface 82 is not a concave surface, but rather an optically flat (i.e., planar) surface.

With continued reference to FIG. 2, the s-polarized light waves 38 exiting the field lens 80 enter the collimating optical module 52 through the surface 54. Following reflection off of a polarizing beamsplitter 74 that is positioned between a slant edge surface of the prism 62 and a slant edge surface of a second prism 68 of the collimating optical module 52, the light waves are coupled out of the collimating optical module 52 through an upper surface 56 of the collimating optical module 52. The light waves then pass through a quarter-wavelength retardation plate 64, are reflected by a reflecting surface 67 of a component 66, e.g., a lens, return to pass again through the retardation plate 64, and re-enter the collimating optical module 52 through the surface 56. The now p-polarized light waves pass through the polarizing beamsplitter 74 and are coupled out of the collimating optical module 52 through a lower surface 58 of the collimating optical module 52. The light-waves then pass through a second quarter-wavelength retardation plate 70, are reflected by a reflecting surface 73 of a second component 72, e.g., a lens, return to pass again through the retardation plate 70, and re-enter the collimating optical module 52 through the surface 58. The now s-polarized light waves reflect off the polarizing beamsplitter 74 and exit the collimating optical module 52 through a side surface 60. The combined effect of the components 66 and 72 on the light waves results in the light waves which exit the collimating optical module 52 through the side surface 60 being collimated the light waves. The reflecting surfaces 67 and 73 can be materialized either by a metallic or a dielectric coating. The s-polarized light waves that exit the collimating optical module 52 are collimated and affected by the field lens 80, such that the rays from each discrete field are parallel to each other. The parallel light rays coupled out of the collimating optical module 52 are coupled into the LOE via the coupling-in optical arrangement 20 (as represented by the optical ray 32 in FIG. 1).

In the embodiment of the optical system described with reference to FIGS. 1 and 2, the field lens 80 is positioned relatively close to the electronic display source 34. However, the proximity of the electronic display source 34 to the illumination prism assembly 36, due to the particular optical design of the optical system, prevents the field lens 80 from being positioned closer to the electronic display source 34. In alternative embodiments of the optical system, the illumination prism assembly and the collimating optical module may be designed to be oriented along different axes. In such embodiments, the field lens can be positioned even closer to the electronic display source, such that the field lens is the closest optical component to the electronic display source.

Figure 4:
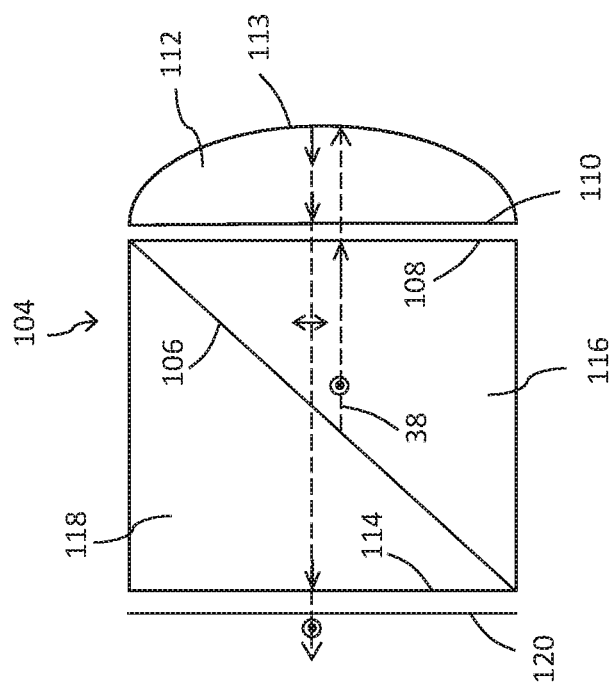
FIG. 4 is a schematic diagram of a collimating optical module according to an embodiment of the present invention.
Figure 3:
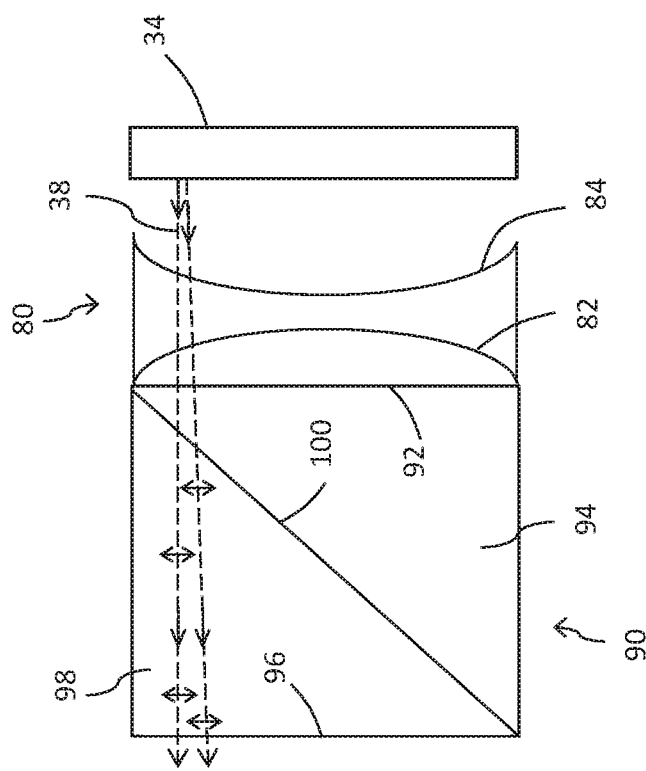
FIG. 3 is a schematic diagram of an illumination prism assembly having a field lens attached thereto, according to an embodiment of the present invention.
Figure 5:
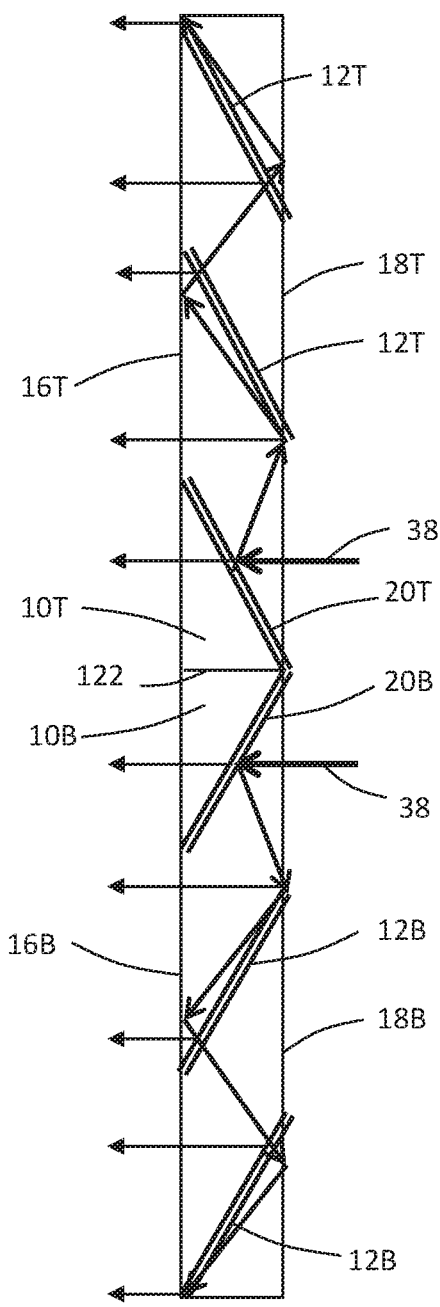
FIG. 5 is a side view of a configuration of an LOE having symmetrical structure.

With continued reference to FIGS. 1 and 2, refer now to FIGS. 3-5, various components of an optical system according to an embodiment of the present disclosure. In this embodiment, the field lens 80 is the closest optical component to the electronic display source 34. Furthermore, whereas the optical system described with reference to FIGS. 1 and 2 provides functionality for aperture expansion in one dimension, the optical system illustrated in FIGS. 3-5 provides functionality for aperture expansion in two dimensions, namely in a first dimension (i.e., lateral aperture expansion) and subsequently in a second dimension (i.e., vertical aperture expansion) orthogonal to the first dimension. The optical components of the two-dimensional aperture expanding optical system will be described in greater detail in subsequent sections of the present disclosure.

Referring to FIG. 3, the optical system includes the electronic display source 34 and an illumination prism assembly 90. Similar to what is described with reference to FIGS. 1 and 2, the illumination prism assembly 90 receives s-polarized light waves from an illumination source (not shown), which are reflected off of a polarizing beamsplitter 100 toward the electronic display source 34 to illuminate the electronic display source 34. The light waves which illuminate the electronic display source 34 are s-polarized, and the illuminated pixels of the electronic display source 34 are activated to generate corresponding pixel output in the form of p-polarized light waves 38 emanating from the active pixels of the electronic display source 34. The p-polarized light waves then pass through the field lens 80.

The field lens 80 may be deployed at various positions in the optical path between the electronic display source 34 and the illumination prism assembly 90. In particular, the field lens 80 is positioned between an input/output surface of the illumination prism assembly 90 and the electronic display source 34. The input/output surface is a light transmissive surface 92 of a prism 94 of the illumination prism assembly 90 that serves as both an output surface for the light waves from the illumination source to couple out of the illumination prism assembly 90 to the electronic display source 34 as well as an input surface for the light waves from the electronic display source 34 to couple into the illumination prism assembly 90.

Similar to what is shown in FIG. 2, the field lens 80 illustrated in FIG. 3 may be implemented as more than one lens, for example as a doublet lens. In the non-limiting implementation of the field lens 80 in FIG. 3, the field lens 80 is a concave lens, wherein portions of the surface 82 are optically attached, for example via optical cement, to the surface 92. In another non-limiting implementation, portions of the surface 84 of the field lens 80 may be optically attached, for example via optical cement, to the output surface of the electronic display source 34. In yet a further non-limiting implementation, the field lens 80 may be mechanically positioned in the optical path between the electronic display source 34 and the illumination prism assembly 90 such that neither of the surfaces 82 and 84 are optically attached to the illumination prism assembly 90 or the electronic display source 34.

Subsequent to passing through the field lens 80, the p-polarized light waves 38 pass through the surface 92 and subsequently through the polarizing beamsplitter 100. The polarizing beamsplitter 100 is positioned between a slant edge surface of the prism 94 and a slant edge surface of a second prism 98. The p-polarized light waves 38 are then coupled out of the illumination prism assembly 90 by passing through a light transmissive surface 96 of the second prism 98 of the illumination prism assembly 90. The p-polarized light waves 38 are coupled into a collimating optical module, which is oriented along a different axis from the illumination prism assembly 90. Due to the different axial orientation, the p-polarized light waves in the illumination prism assembly 90 orientation that are coupled into the collimating optical module are in fact s-polarized light waves in the collimating optical module orientation.

With continued reference to FIG. 3, refer now to FIG. 4, which illustrate a collimating optical module 104 having an axial orientation different from the axial orientation of the illumination prism assembly 90. The collimating optical module 104 includes one or more optical components, e.g., lens 112 and prisms 116, 118, which are the drivers of field curvature effects of the optical system when used in combination with a flat display source. As such, one or more of the optical components of the collimating optical module 104 constitute optical elements that define the field curvature of the optical system, which results in a non-parallel beam of light rays at the input to the LOE.

Following reflection off of a polarizing beamsplitter 106 that is positioned between a slant edge surface of a first prism 116 of the collimating optical module 104 and a slant edge surface of a second prism 118 of the collimating optical module 104, the light waves are coupled out of the collimating optical module 104 through a light transmissive side surface 108 of the collimating optical module 104. The light waves then pass through a quarter-wavelength retardation plate 110, are collimated by a component 112, e.g., a lens, at its reflecting surface 113, return to pass again through the retardation plate 110, and re-enter the collimating optical module 104 through the surface 108. The now p-polarized light waves pass through the polarizing beamsplitter 106 and are coupled out of the collimating optical module 104 through a light transmissive side surface 114 opposite the surface 108. In certain embodiments, the p-polarized light waves pass through a half-wavelength retardation plate 120, which converts the light waves to s-polarized light. The now s-polarized light waves 38 enter a symmetric LOE to perform aperture expansion. In other embodiments, the half-wavelength retardation plate is absent, and the light waves that enter the symmetric LOE are p-polarized. In yet further embodiments, the polarization of the light waves entering the symmetric LOE is determined by the axial orientation of the symmetric LOE relative to the axial orientation of the collimating optical module 104.

With continued reference to FIGS. 3 and 4, refer now to FIG. 5, a non-limiting implementation of a symmetric LOE. In the non-limiting implementation, the symmetric LOE is constructed from two identical LOEs that are generally similar in structure to the LOE described with reference to FIG. 1, with several key differences that will become apparent. The substrate of the symmetric LOE is sub-divided into a top portion of the substrate 10T that corresponds to the top LOE, and a bottom portion of the substrate 10B that corresponds to the bottom LOE. Each of the LOEs which make up the symmetric LOE include major lower and upper surfaces, namely the top LOE includes major lower and upper surfaces 16T, 18T and the bottom LOE includes major lower and upper surfaces 16B, 18B. The two LOEs also include respective coupling-in optical arrangements 20T and 20B which coupled the light waves from the collimating optical module 104 into the respective top and bottom portions 10T, 10B. Contrary to the depiction of the LOE illustrated in FIG. 1, the edges of the top and bottom portions 10T, 10B are normal to the major lower and upper surfaces 16T, 18T, 16B, 18B, and the coupling-in optical arrangements 20T and 20B are implemented as partially reflecting surfaces embedded inside the respective substrate portions 10T, 10B. The coupled-in light waves are trapped inside the respective substrate portions 10T, 10B by total internal reflection, and are gradually coupled out by respective selective partially reflecting surfaces 12T, 12B. The subdivided portions 10T, 10B may in fact be fabricated as separate LOEs, which are then attached via a cemented surface 122 of the two substrate portions 10T, 10B.

The light waves coupled out from the symmetric LOE are then coupled into an additional LOE, similar to the LOE described with reference to FIG. 1, to undergo aperture expansion in a second dimension orthogonal to the aperture expansion dimension performed by the symmetric LOE. Note that the field curvature mitigation methodologies of the embodiments of the present disclosure are contemplated in combination with other multi-dimensional aperture expansion techniques, such as, for example, those disclosed in the applicant's commonly owned U.S. Pat. No. 10,133,070 and U.S. patent application Ser. No. 15/978,139, whose disclosures are incorporated by reference in their entireties herein.

Although the optical systems as described thus far have pertained to utilizing a field lens, implemented as one or more lenses, to mitigate the effects of field curvature stemming from the general flatness of an electronic display source (i.e., the electronic display source 34), other embodiments are possible which utilize alternate techniques to mitigate field curvature effects, significantly reduce the magnitude of such effects, or altogether prevent the occurrence of field curvature phenomenon. In one such embodiment, the electronic display source 34 is implemented as a curved display source, such as, for example, a curved OLED microdisplay. The curvature of the curved display source is matched to the field curvature of the optical system. The matched curvature of the electronic display source 34 enables the (curved) electronic display source 34 to counteract the divergence or convergence of the traversing light rays (i.e., the light rays coupled into the LOE) caused by field curvature effects. Since the field curvature of the optical system can be determined, for example via simulation or experimentation, the curvature of a curved display required for matching (or partially matching) the field curvature of the optical system can also be determined. By utilizing a curved display source, the object to be imaged (i.e., the object plane) is no longer flat, and therefore the effects of field curvature are eliminated when viewing the image output by the optical system. In other words, the outgoing beam from the collimating optics, e.g., the collimating optical modules 52 or 104 (and equivalently the incoming beam to the LOE) consists of parallel light rays.

Figure 6:
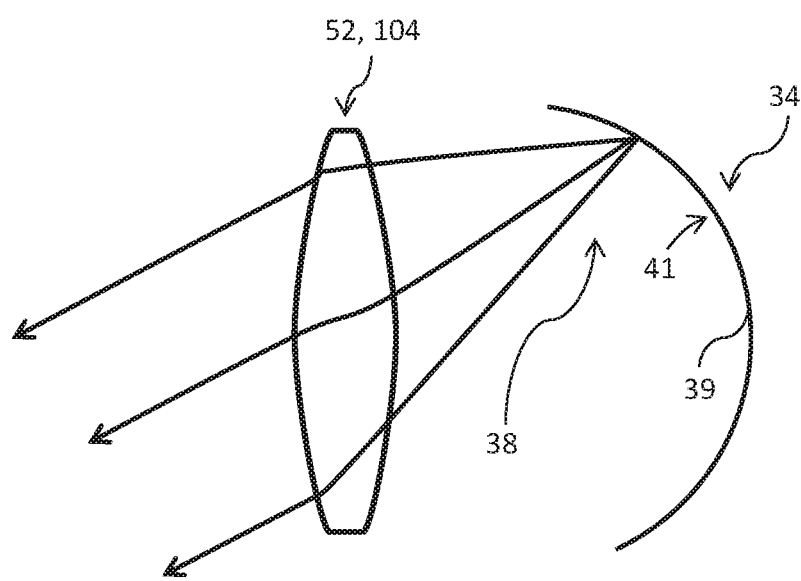
FIG. 6 is a schematic diagram of the traversal of light rays from a curved electronic display source through collimating optics, according to an embodiment of the present invention.

FIG. 6 illustrates a schematic representation of such a curved electronic display source 34, according to embodiments of the present disclosure. The curved electronic display source 34 has a curved image projecting surface 39 from which light waves (i.e., the light rays 38) emanate, resulting in a curved (i.e., non-flat) object plane 41. FIG. 6 further illustrates the traversal of light rays 38 from the curved electronic display source 34 through collimating optics (e.g., the collimating optical modules 52 or 104), which is depicted schematically in the figure as a single lens. As can be seen, the outgoing beam from the collimating optics consists of parallel light rays.

In other embodiments, the electronic display source 34 is implemented as a curved display source having curvature that is partially matched to the field curvature of the optical system such that the effects of field curvature are not completely eliminated when relying on the curved display source alone. In other words, the partially matched curvature of the electronic display source 34 enables the (curved) electronic display source 34 to partially counteract the divergence or convergence of the traversing light rays caused by the field curvature effects. In such embodiments, a field lens, deployed similarly to the field lens of the previously described embodiments, is used in combination with the curved electronic display source 34 to mitigate the effect of the field curvature. Such embodiments may be used to advantage to reduce the power requirements of the field lens 80, as the partially matched curved display source reduces (i.e., lessens) the amount of corrective power the field lens 80 is required to apply in order to refract the converging or diverging light rays. In such embodiments, the field lens 80, having reduced corrective power, creates a partially compensating field curvature that partially compensates the field curvature of the optical system by partially counteracting the divergence or convergence of the light rays. By creating a partially compensating field curvature, the field lens 80 produces a reduced (but still present) field curvature effect of the optical system that is reduced with respect to the field curvature effect that would otherwise be present if the optical system did not include the field lens 80. The curvature of the curved electronic display source 34 is matched to the reduced field curvature of the optical system to counteract the divergence or convergence of the traversing light rays caused by the reduced field curvature, thereby mitigating the remaining effect of field curvature that is not completely mitigated by the field lens 80.

The optical systems according to embodiments of the present disclosure can be used as part of a mono-ocular optical system, in which images are projected into a single eye of the viewer. Alternatively, it may be desirable to project images into both eyes of the viewer, such as in head-up display (HUD) applications and stereo vision systems. In such alternatives, two optical systems can be used, with each optical system having a field lens and/or a curved display source, an illumination prism assembly, a collimating optical module, and an LOE, deployed for projecting images into a different eye of the viewer. For example, a HUD employing two optical systems may be installed in front of a car driver, for example integrated into the dashboard of a vehicle, so as to provide assistance in driving navigation or to project thermal images into the eyes of the driver in low-visibility conditions. In such embodiments, a thermal camera may be deployed to capture thermal images of the real-world scene. The thermal images may then be provided to the electronic display source to enable coupling-in of light waves corresponding to the thermal images into the LOE.

It is noted that for each instance where a particular polarized wave path has been followed in the examples described above, the polarizations are interchangeable. In other words, on altering the orientation of the polarizing beamsplitters, each mention of p-polarized light could be replaced by s-polarized light, and vice versa. As such, the specific use of the particular beamsplitters in the illumination prism assembly 36 and the collimating optical module 52, and in the illumination prism assembly 90 and the collimating optical module 104, in the examples described above, are not intended to be limiting, and are provided for illustrative purposes in order to better describe the operation of the optical systems according to embodiments of the present disclosure.

Although the optical systems of the embodiments of the present disclosure have been described within the context of an optical waveguide implemented as an LOE, the optical systems of the present disclosure may be applicable to other types of optical waveguide technologies, including waveguides that rely on diffractive techniques to couple light waves into and/or out of a light waves-transmitting substrate. For example, instead of implementing the coupling-out optical arrangement 12 as an array of selective partially reflecting surfaces, the coupling-out optical arrangement 12 can be implemented as one or more diffractive elements that extends along portions of the major lower surface 16 of the substrate 10. As a further example, instead of the implementing the coupling-in optical arrangement 20 as a slanted edge 22 together with a prism 24, or as a reflecting surface oriented at an oblique angle, the coupling-in optical arrangement can be implemented as a diffractive element that extends along a portion of the either the major lower surface 16 or the major upper surface 18 of the planar substrate 10.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical system, comprising:
   a light-transmitting substrate having a plurality of surfaces including at least a first and a second major external surface;
   an electronic display source from which light waves emanate;
   a coupling-in optical arrangement for coupling light waves emanating from the electronic display source into the light-transmitting substrate to effect total internal reflection of the coupled-in light waves between the major external surfaces of the light-transmitting substrate;
   at least one optical element deployed in an optical path for light waves to traverse from the electronic display source into the light-transmitting substrate, the at least one optical element defining a field curvature of the optical system that causes light rays of the traversing light waves to diverge or converge; and
   at least one lens deployed in the optical path downstream from the electronic display source and upstream from the coupling-in optical arrangement, wherein the at least one lens creates a partially compensating field curvature and partially compensates the field curvature of the optical system so as to reduce the field curvature of the optical system, and wherein the electronic display source is a curved display source having a curvature that is matched to the reduced field curvature of the optical system so as to counteract divergence or convergence of the traversing light rays caused by the reduced field curvature.

2. The optical system of claim 1, wherein the at least one lens is a positive powered lens.

3. The optical system of claim 1, wherein the at least one lens is a negative powered lens.

4. The optical system of claim 1, wherein the at least one lens includes a concave surface.

5. The optical system of claim 1, further comprising:
   an illumination prism assembly for directing light from an illuminator to the electronic display source to stimulate the electronic display source to emanate light waves, and for directing the light waves emanating from the electronic display source toward the coupling-in optical arrangement.

6. The optical system of claim 5, wherein at least a portion of the at least one lens is optically attached to at least a portion of the illumination prism assembly.

7. The optical system of claim 5, wherein the illumination prism assembly includes at least one prism and a polarization sensitive beamsplitter, and wherein at least a portion of the at least one lens is optically attached to at least a portion of a surface of the at least one prism.

8. The optical system of claim 5, further comprising:
an optical module for receiving the light waves emanating from the electronic display source via the illumination prism assembly, and for collimating the received light waves and directing the collimated light waves to the coupling-out optical arrangement.

9. The optical system of claim 8, wherein at least a portion of the at least one lens is optically attached to at least a portion of the optical module.

10. The optical system of claim 8, wherein the optical module includes a pair of prisms and a polarization sensitive beamsplitter, and wherein at least a portion of the at least one lens is optically attached to at least a portion of a surface of at least one of the prisms.

11. The optical system of claim 8, wherein the at least one lens is deployed in the optical path downstream from the illumination prism assembly and upstream from the optical module.

12. The optical system of claim 8, wherein the at least one optical module includes the at least one optical element.

13. The optical system of claim 1, further comprising:
an optical module for collimating the light waves emanating from the electronic display source and directing the collimated light waves to the coupling-in optical arrangement.

14. The optical system of claim 13, wherein at least a portion of the at least one lens is optically attached to at least a portion of the optical module.

15. The optical system of claim 13, wherein the optical module includes a pair of prisms and a polarization sensitive beamsplitter, and wherein at least a portion of the at least one lens is optically attached to at least a portion of a surface of at least one of the prisms.

16. The optical system of claim 13, wherein the optical module further includes at least one collimating lens.

17. The optical system of claim 13, wherein the optical module includes the at least one optical element that defines the field curvature of the optical system.

18. The optical system of claim 1, wherein the electronic display source is a micro-display.

19. The optical system of claim 1, wherein the electronic display source is an organic light emitting diode display.

20. An optical system, comprising:
a light-transmitting substrate having a plurality of surfaces including at least a first and a second major external surface;
an electronic display source from which light waves emanate;
a coupling-in optical arrangement for coupling light waves emanating from the electronic display source into the light-transmitting substrate to effect total internal reflection of the coupled-in light waves between the major external surfaces of the light-transmitting substrate; and
at least one optical element deployed in an optical path for light waves to traverse from the electronic display source into the light-transmitting substrate, the at least one optical element defining a field curvature of the optical system that causes light rays of the traversing light waves to diverge or converge, and wherein the electronic display source is a curved display source having a curvature that is matched to the field curvature of the optical system so as to counteract the divergence or convergence of the light rays caused by the field curvature.

21. The optical system of claim 20, wherein the electronic display source is a micro-display.

22. The optical system of claim 20, wherein the electronic display source is an organic light emitting diode display.

* * * * *